United States Patent [19]

Fisher et al.

[11] 4,034,931
[45] July 12, 1977

[54] LOCKING SEAT BELT RETRACTOR

[75] Inventors: Robert C. Fisher, West Palm Beach, Fla.; Cecil A. Collins, Pontiac, Mich.

[73] Assignee: Robert C. Fisher, West Palm Beach, Fla.

[21] Appl. No.: 648,396

[22] Filed: Jan. 12, 1976

[51] Int. Cl.² .................. A62B 35/00; B65H 75/48
[52] U.S. Cl. ........................................ 242/107.4 D
[58] Field of Search ............ 242/107.4 R, 107.4 D, 242/107.4 A, 107.4 B, 107.4 E, 107.6, 107.7

[56] References Cited

U.S. PATENT DOCUMENTS

| 3,558,075 | 1/1971 | Stoffel | 242/107.4 D |
|---|---|---|---|
| 3,598,336 | 8/1971 | Frost | 242/107.4 D |
| 3,746,274 | 7/1973 | Yang | 242/107.4 R |
| 3,767,135 | 10/1973 | Booth | 242/107.4 D |
| 3,880,379 | 4/1975 | Booth | 242/107.4 D X |

Primary Examiner—Stanley N. Gilreath
Assistant Examiner—John M. Jillions
Attorney, Agent, or Firm—Harness, Dickey & Pierce

[57] ABSTRACT

An automatic locking seat belt retractor is disclosed. The seat belt is wound on a spring-actuated spool which exerts a constant belt retracting force on the belt while allowing it to be protracted manually off the spool. A mechanism is provided for locking the belt against protraction at any desired degree of extension by locking the spool against unwinding rotation. The locking mechanism operates in response to a limited retracting movement of the spool and consists of a pawl and ratchet normally biased to an engaging position to prevent unwinding rotation of the spool. An indexing finger is attached to the pawl and a grooved plate is attached to the spool. The free end of the indexing finger is in contact with the grooved plate, the grooves thereon indexing the finger to a desired position according to the protracted or retracted condition of the belt. The position of the pawl is controlled relative to the ratchet in accordance with the position of the indexing finger on the grooved plate.

14 Claims, 14 Drawing Figures

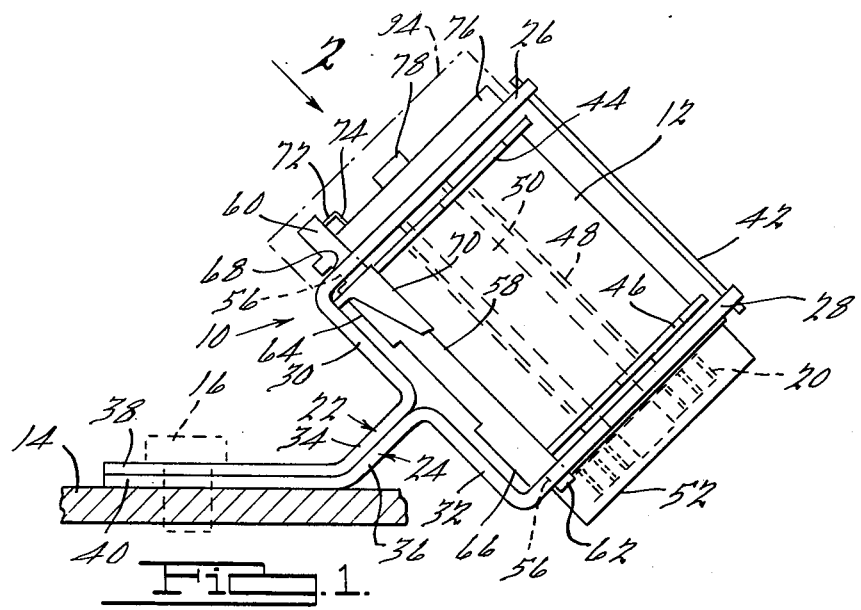

LOCKING SEAT BELT RETRACTOR

BACKGROUND — SUMMARY OF THE INVENTION

The present invention relates to automatic locking seat belt retractors of the type in which the belt is wound on a spring-actuated spool which exerts a constant retracting force on the belt while allowing the belt to be extended by manually pulling it off the spool, in which means are provided for locking the belt against further extension at any desired degree of extension by locking it against unwinding rotation. The present invention is an improvement over the automatic seat belt retractor shown in U.S. Pat. No. 3,667,698.

The seat belt retractor which is the subject matter of U.S. Pat. No. 3,667,698 has proven to be very reliable and satisfactory and has achieved wide-spread commercial acceptance in the automobile industry. In the seat belt retractor disclosed in that patent, the locking action consists of a pawl that is normally biased to an engaged position with a ratchet to prevent unwinding rotation of the spool. The retractor has a clutch which is journaled concentrically with the spool for limited rotation with the spool through a frictional driving connection with the spool. The clutch is driven to one limit of its movement by initial extension of the seat belt and in that position holds the pawl out of engagement during further extension. Initial retracting movement at any degree of extension moves the clutch to a position in which it allows pawl engagement, thereby locking the belt against extension due to a subsequent protraction. The retractor also includes secondary means for unlocking the pawl and holding it in the unlocked condition automatically when the belt is subsequently fully retracted. The secondary means is driven by the spool and is effective to hold the pawl out of engagement when the belt is fully retracted and during a limited initial extension from the fully retracted position.

Due to the frictional forces necessary to operate the patented seat belt retractor, a relatively heavy return spring is required on the spool. Thus, protraction of the belt is relatively difficult and an uncomfortably strong bias is placed on the lap of the user.

Accordingly, an object of the present invention is to provide an improved automatic locking seat belt retractor which is an improvement over the seat belt retractor shown in U.S. Pat. No. 3,667,698.

Another object of the present invention is to provide a seat belt retractor which permits protraction of the belt by a relatively light force.

A further object of the present invention is to provide an improved locking seat belt retractor which does not utilize a clutch.

Still another object of the present invention is to provide an improved seat belt retractor having a minimum of parts.

The foregoing and other objects are achieved according to the present invention by employing a relatively light spring which exerts a constant relatively light belt retracting force. A pawl and ratchet assembly are provided for locking the belt against further extension at any desired degree of extension. An indexing finger is attached to the pawl, a free end of which is in contact with a grooved plate attached to and rotatable with the spool. The grooved plate has a number of grooves set in specific patterns thereon for locating and guiding the indexing finger into appropriate positions according to the degree of protraction or retraction of the seat belt. The position of the indexing finger on the grooved plate in turn sets the pawl in a specified position relative to the ratchet. At certain positions of the indexing finger on the grooved plate, the pawl is moved into engagement with the ratchet thereby locking the seat belt against further extension.

Other objects, advantages and features of the invention will become apparent from the following description taken in conjunction with the accompanying drawings.

BRIEF DESCRIPTION OF THE DRAWINGS

FIG. 1 illustrates an automatic locking seat belt retractor in accordance with the present invention;

FIG. 2 is a view of the present invention as indicated in the direction of the arrow 2 in FIG. 1;

FIG. 3 is a sectional view taken along lines 3—3 of FIG. 2;

DESCRIPTION OF THE PREFERRED EMBODIMENT

Figure 4:
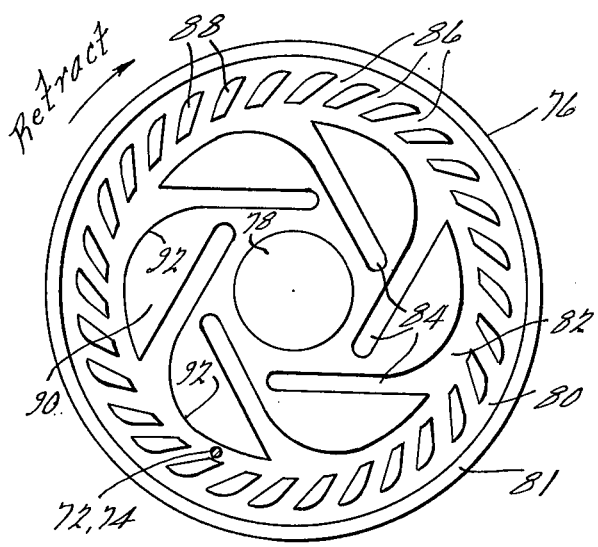
FIGS. 4–8 illustrate the locating of the indexing finger on the grooved plate during operation of the present invention.

A locking seat belt retractor assembly 10 in accordance with the present invention is shown in FIGS. 1 and 2. The assembly 10 has a conventional fabric seat belt 12 wound thereon. The retractor assembly 10 is adapted to be mounted on the floor 14 of a vehicle and to be secured thereto by a bolt 16.

The retractor assembly 10 permits extension of the seat belt 12 so that the tongue 18 thereon can be detachably secured to a belt buckle on an associate belt half (not shown). When the belt 12 is not in use, the assembly 10 through operation of an internal spring 20 acting against a belt support spool later to be described, functions to retract the belt 12 and the tongue 18 to the fully retracted position. The seat belt 12 in most applications normally retracts to position where it is prevented from further retraction by the edges of a slot in the top of an appropriate retractor housing (not shown) which is attached either to the retractor belt assembly 10 or to the floor 14 of the vehicle.

The assembly 10 includes a pair of support members 22 and 24 which act to hold the seat belt retractor assembly together and also support it at an appropriate inclination and position from the floor 14. The support members 22 and 24 are preferably steel stampings, and have a pair of upper support legs 26 and 28 arranged in spaced parallel relationship extending upwardly from intermediate support sections 30 and 32. The intermediate support sections 30 and 32 extend substantially perpendicular to lower support legs 34 and 36 which in turn are connected to flanges 38 and 40 which are mounted on the floor 14. The support members 26 and 28 preferably are fixedly secured together along the lower support legs 34 and 36 by spot welding. The support legs 26 and 28 of the support members 22 and 24 are preferably held in spaced apart parallel relationship by means of an additional support member 42 which is positioned in appropriate slots in the support legs 26 and 28 and held in position by crimping.

The assembly 10 also includes a pair of spool flanges 44 and 46 which are secured together by an open-sided generally cylindrically-shaped belt support spool body 48. A shaft 50 extends coaxially through the spool body 48 and its opposite ends extend through a pair of central apertures (not shown) formed in the spool flanges 44 and 46. The shaft 50 is affixed to the spool flanges 44 and 46 in any suitable manner, such as by a press fit, and the shaft and spool are rotatably mounted in the assembly 10.

The coil spring 20 is preferably fabricated of a strip of spring steel which is disposed in a coil configuration, with the center of the coil being attached to the end of shaft 50 protruding through an aperture in the upwardly extending support leg 28. The coil spring 20 is attached to the shaft 50 by an appropriate slot in the end of the shaft 50. The opposite (outer) end of the spring 20 is reversely bent to form a hook which is secured over an edge portion of an annular, generally cup-shaped enclosure 52 mounted on the outer side of the support leg 28. The enclosure 52 prevents dust, water and other debris from affecting the operation of the coil spring 20 and shaft 50.

Each of the spool flanges 44 and 46 have a plurality of ratchet teeth 54 on the perimeter thereof which cooperate with other portions of the assembly 10 to lock the seat belt against protraction.

Each of the support legs 26 and 28 is provided with a generally bow-tie shaped aperture 56. The apertures 56 in the support legs are laterally aligned in the assembly 10 for operatively supporting a pawl 58. The pawl 58 is preferably made of a hard material, such as metal, and is in the form of a flat bar which extends parallel to the shaft 50. As described more fully in U.S. Pat. No. 3,667,698, the disclosure thereof which is incorporated herein by reference, the pawl 58 comprises a pair of longitudinally or outwardly extending end portions 60 and 62 and a pair of projections 64 and 66 which, as will be explained hereinafter, cooperate with the ratchet teeth 54 on the spool flanges 44 and 46 to lock the seat belt against extension. The reduced end 62 and the reduced section 68 of pawl 58 are adapted to fit within the aligned apertures 56 in the support legs 26 and 28 for supporting the pawl 58 for pivotal movement between locked and unlocked position, as will later be described.

Attached to the pawl 58 is a biasing member 70 which typically is in the form of a leaf-spring. As shown in FIG. 2, the spring 70 rests and presses against the base 30 of the support member 22. By means of the force produced by the spring 70, the pawl 58 is biased clockwise, as seen in FIG. 2, to an engaging position with the ratchet teeth 54.

It will be seen that the pawl 58 is supported relative to the seat belt spool in such a manner that the pawl projections 64 and 66 are aligned and engageable with the ratchet teeth 54 formed around the periphery of the spool flanges 44 and 46. At appropriate sequences during the operation of the seat belt retractor assembly 10, the projections 64 and 66 engage the ratchet teeth 54 and preclude further rotation of the spool in a manner which would permit protraction of the seat belt 12.

In accordance with the present invention, an indexing finger 72 is positioned on the outwardly extending end 60 of the pawl 58. As shown in FIG. 2, the indexing finger 72 is formed in such a manner that it extends upwardly away from the pawl 58 generally toward the axis of the seat belt spool. A free end 74 of the indexing finger 72 is bent inwardly substantially parallel to the axis of the shaft 50.

Attached to one end of the shaft 50 is a grooved plate 76 which is in operative communication with finger 72. The locater plate 76 is securely fastened to the shaft 50 of the seat belt spool by a set screw 78 so as to rotate with the shaft 50.

A belt sensing guide (follower) 77 is also attached to the pawl 58. The follower 77 comprises a piece of metal positioned such that it rides on the outer surface of the belt 12 when the belt is substantially fully wound on the spool. The force applied on the guide 77 by the wound roll of belt 12 acts to hold the pawl 58 in a fully disengaged (unlocked) position. The belt guide 77 operates in combination with the indexing finger 72 and grooved plate 76 in a manner which will be described hereinafter.

As seen in FIGS. 3-8, the grooved plate 76 has a plurality of land areas and valley areas forming a specific arrangement of grooves for locating the indexing finger 72 at certain positions thereon and in turn rotating the pawl 58 to certain positions relative to the ratchet teeth 54. The plate 76 has an outer or "first-extension" circular-shaped groove 80 near the outer circumference of the plate 76. Concentrically inwardly of the groove 80 is a second circular groove 82 which can be called the "rest" or retraction groove for the plate 76. Positioned radially inwardly from the groove 82 are a plurality of grooves 84 which extend generally radially inwardly toward the axis of rotation of the plate 76. A peripheral land area 81 is provided on the outer periphery of the groove 80 to insure that the finger 72 remains on the plate 76.

Lying at non-radial inclinations on the plate 76 between the concentric grooves 80 and 82 are a plurality of short grooves 86. The combination and arrangement of the grooves 80, 82 and 86 define a plurality of land areas 88 positioned between the circular grooves 80 and 82. In the center portion of the plate 76, the grooves 84 define a plurality of land areas 90. At the radially outer ends of the groove 84, rounded leadin areas 92 are provided on the land areas 90 to allow the end 74 of the finger 72 to be easily led into the grooves 84 at the appropriate moment of the operation of the assembly 10. All of the grooves 80, 82, 84 and 86, together with the land areas 88 and 90, cooperate in a manner which will be described below to locate and position the indexing finger 72 in accordance with the desired degree of protraction or retraction of the seat belt 12.

The rest position of the locking seat belt assembly 10, which occurs at the end of full retraction of the belt 12, is shown in FIGS. 2 and 4. In this position, as best seen in FIG. 4, the indexing finger 72 is positioned in the groove 82 on the plate 76.

Figure 5:
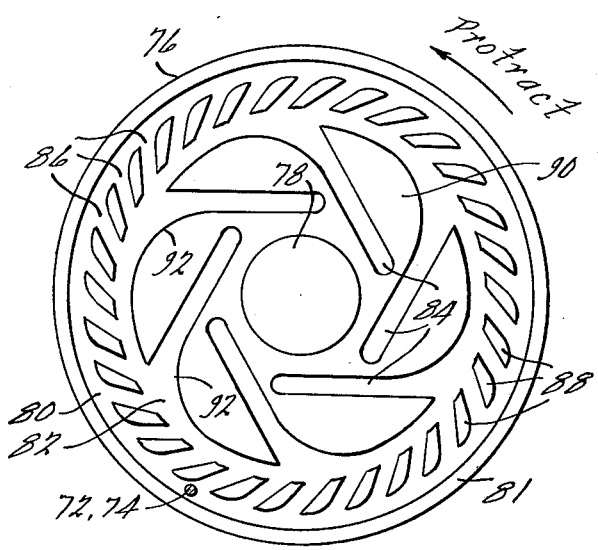

As seen in FIG. 5, as the seat belt 12 is initially extended, the indexing finger 72 is directed from groove 82 to the outer groove 80. This occurs because of the bias on the pawl 58 and finger 72 caused by the riding of the belt follower 77 on the belt 12. The pawl 58 is biased away from engagement with the ratchet teeth 54, which bias also moves the finger 72 into the grooves 86 toward the outermost groove 80. The angular orientation of the grooves 86 enhance this movement upon protraction of the belt 12. Stated in another manner, as the plate 76 is rotated, counterclockwise as shown in FIG. 5, the force on index finger 72 caused by belt guide 77, directs the finger 72 through one of the inclined grooves 86 into groove 80.

When the indexing finger 72 is transported radially outwardly to the furthest extent on the plate 76, the pawl 58 will be inclined at the furthest extent away from and thus held out of engagement with the ratchet teeth 54 on the spool flanges 44 and 46. The movement of the indexing finger 72 toward and into the outside circular groove 80 during initial protraction insures that the pawl 58 will not engage with the ratchet teeth 54 during further protraction of the belt 12. Engagement of the follower 77 with the belt 12 insures that the belt 12 will not lock at minor degrees of protraction (for example, if the wearer hesitates in initially extending the belt or extends it initially in a series of short pulling steps).

Figure 6:
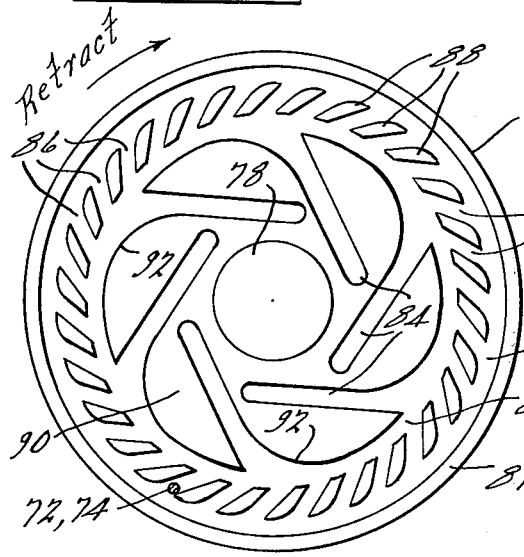

An intermediate stage in the movement of the indexing finger 72 from the first protraction position to the first retraction position is shown in FIG. 6. During this stage, the grooved plate 76 rotates clockwise (in the direction of the arrow).

During normal use, the person wishing to connect the seat belt around his waist, would extend the seat belt 12 from the assembly 10 a sufficient distance and then snap the tongue 18 into the buckle half of the seat belt. During this operation, the indexing finger 72 would be moved from the position shown in FIG. 4 to the position shown in FIG. 5. Then, since the person would have pulled the belt slightly farther than required to allow the belt to be snugly fastened around his waist, the seat belt 12 will retract slightly on the spool until the belt fits snugly on him. Since the follower 77 is now incapable of biasing the pawl to the unlock condition, the spring 70 tends to do so placing a radially inward bias on the finger 72. This causes the indexing finger 72 to be caught in the grooves 86, as shown in FIG. 6, and to be returned to the inner circular groove 82.

Figure 7:
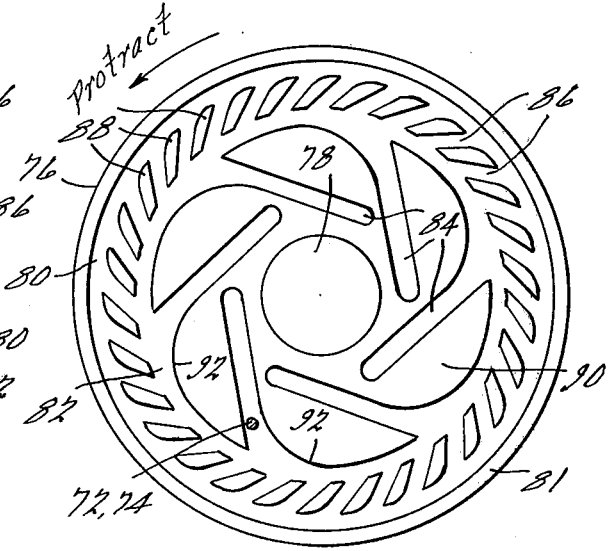
Figure 8:
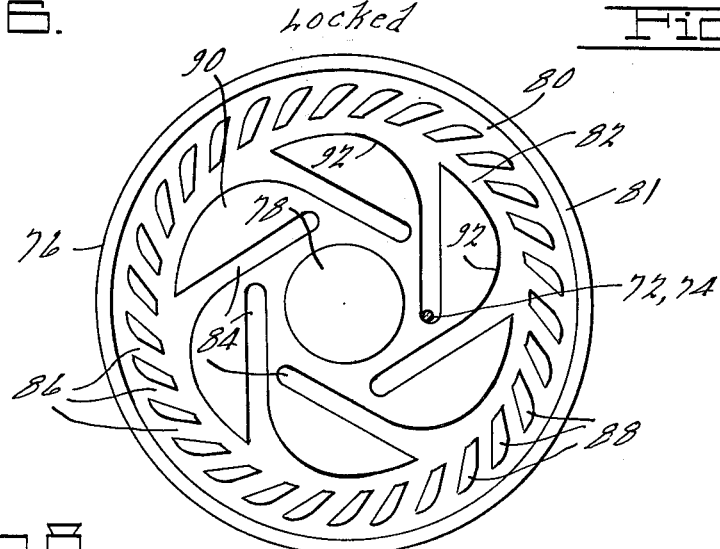

Since there is now a radially inward bias on the finger 72, protraction of the seat belt 12 will cause the pawl and ratchet assembly to engage thus locking the belt 12 from further protraction. This is illustrated by FIGS. 7 and 8. Due to the bias force caused by spring 70 on the pawl 58, as well as the shape of the grooves 84, the lead-in areas 92, and the land areas 90, and the direction of rotation of the seat belt spool, counterclockwise as shown in FIG. 7, the indexing finger 72 will be moved into one of the grooves 84 upon any further protraction. As the plate 76 continues to rotate, the indexing finger 72 will proceed the length of a groove 84 and eventually come to the end thereof near the central axis of the plate 76, as seen in FIG. 8. At this point, the corresponding movement of the pawl 58 toward the spool will be such that the projections 64 and 66 will be in position to engage the ratchet teeth 54. Once the pawl and ratchet come into engagement, the seat belt retractor assembly 10 will be locked and any further extension of the seat belt 12 will be prevented. In this manner, an occupant of the vehicle with the seat belt 12 fastened around him will be prevented from moving forwardly in the event of a sudden stoppage of the vehicle.

Upon release of the buckle tongue 18, the plate 76 will rotate in the retract direction from the position illustrated in FIG. 8, driving the finger 72 radially outwardly into the groove 82, as shown in FIG. 4.

A cup-shaped enclosure 94 is mounted on the outer side of support leg 26 to cover and enclose the indexing finger 72 and groove plate 76. The enclosure 94 protects the locating and indexing mechanism from debris which might affect the operation thereof.

Figure 9:
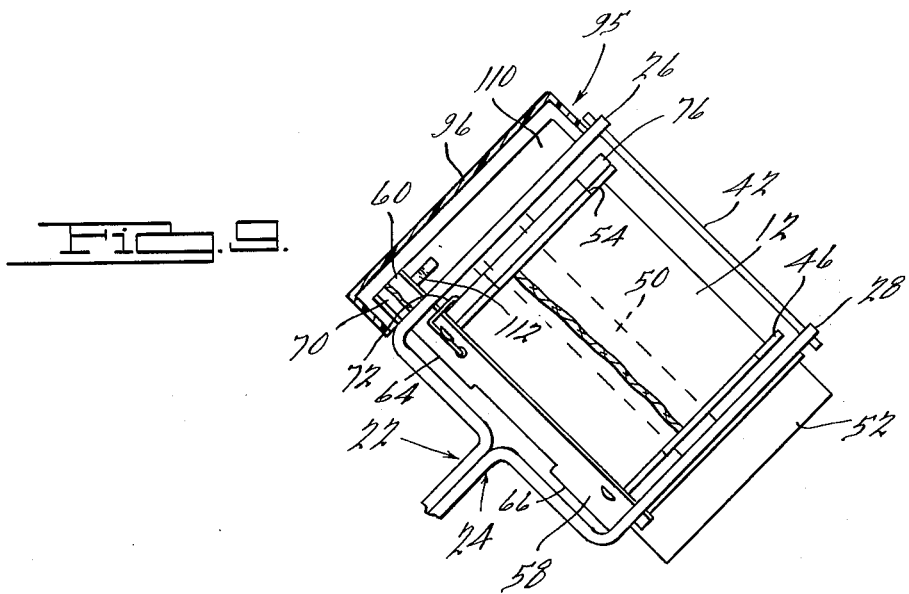
FIGS. 9 and 10 illustrate another embodiment of the invention.
Figure 10:
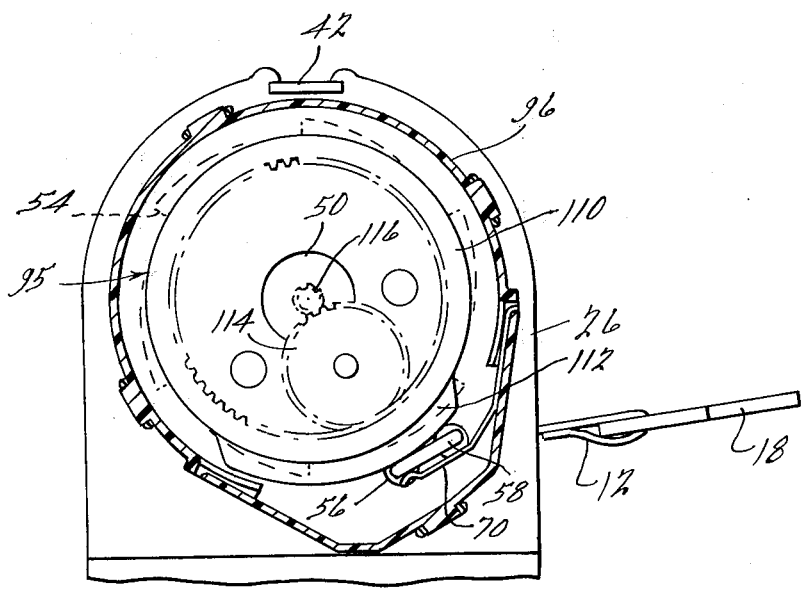

Another embodiment of the invention is shown in FIGS. 9 and 10. In this embodiment, the grooved plate 76 and indexing finger 72 are positioned inwardly of the support leg 26 rather than outwardly as shown in FIGS. 1 and 2. The grooved plate is attached directly to the spool flange 44 and rotates therewith. The indexing finger 72 is again attached to the pawl 58, but at a position inwardly of the support leg 26. Positioning the plate 76 and finger 72 on the inside of the seat belt assembly 10 allows space for mounting of the various safety warning and starter interlock mechanisms that are required on many vehicles today. The operation of such mechanisms is often dependent on the degree of protraction of the seat belt 12 and thus they can be mounted directly on the support leg 26 where they can be in direct operative communication with the main shaft 50 of the assembly 10.

Placing the plate 76 and finger 72 inwardly of the support leg 26 also allows for placement of a cam and gear mechanism (indicated generally by the numeral 95) for disengaging the pawl 58 from the ratchet teeth 54 and transporting the finger 72 to the outer areas of the plate 76 when the seat belt 12 is fully or substantially wound on the belt spool. An enclosure 96 (similar to enclosure 54) is secured on the support leg 26 over the mechanism 95 to protect it.

In the cam and gear mechanism 95, an annular gear 110 having teeth on the inside surface thereof is rotatably attached to the support leg 26. The gear 110 is driven by a gear wheel 114 mounted on the support leg 26. The wheel 114 is driven in turn by a pin gear 116 attached to the end of the shaft 50. Thus, the gear 110 and cam 112 are rotated in direct relationship to the protraction and retraction of the seat belt 12.

The cam 112 is constructed such that it engages the pawl 58 to pivot and hold the pawl 58 out of engagement with the ratchet teeth 54 when the belt 12 is substantially retracted.

Figure 12:
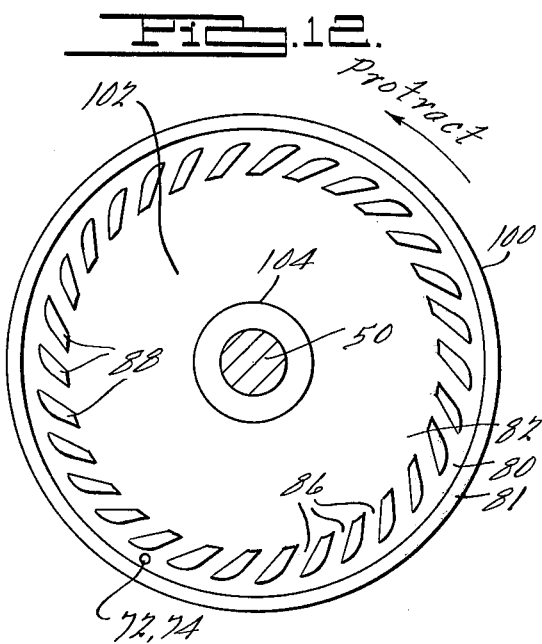

The cam and gear mechanism operates fully in combination with the indexing finger 72 and the grooved plate 76 (or 100). Movement of the pawl 58 by the cam lobe 112 biases and directs the tip 74 of the finger 72 toward the outermost groove 80. The finger 72 will then be directed into groove 80 when the seat belt 12 is initially extended, as shown in FIGS. 5 and 12, which will insure that the pawl and ratchet mechanism does not engage and lock the assembly 10 during further protraction of the belt. When the belt 12 is substantially fully retracted, the cam lobe 112 will again engage the pawl 58 and bias the finger 72 in a direction toward the outer groove 80. In this manner, the finger 72 will be positioned to immediately enter groove 80 when the belt 12 is extended.

In the embodiment shown in FIGS. 9 and 10, the spring 70 is also positioned outside of the support leg 26. The spring 70 is attached to the enclosure 96 and biases the pawl 58 toward locking engagement with the ratchet teeth 54 (clockwise in FIG. 10).

FIGS. 11–14 illustrate an embodiment of a grooved plate which can be utilized in the present invention. The grooved plate is indicated generally by the numeral 100. Similar to grooved plate 76 described above, the plate 100 has an outer circular groove 80, an inner circular groove 82 which is concentric with groove 80, and a plurality of relatively short, inclined grooves 86 positioned between and in operative communication with grooves 80 and 82. A plurality of arcuate-shaped "land" areas 88 also are defined by the grooves 80, 82 and 86. An outer land area 81 is provided on the outer periphery of the plate 100 to insure that the indexing finger 72 remains on the plate 100 at all times. The central area 102 of the plate 100 is recessed to the depth of the grooves 80, 82 and 86. A central boss 104 is provided in the center of the plate 100 for mounting the plate 100 on the shaft 50.

The remainder of the seat belt retractor assembly 10 utilizable with plate 100 is the same as discussed above with reference to FIGS. 1 and 2. The plate 100 in cooperation with the finger 72 and the biasing spring 70, which biases the pawl 58 toward locking engagement with the ratchet teeth 54, provides the same automatic locking and unlocking operation as discussed above. It is possible to position the grooved plate 100 and indexing finger 72 either outwardly (FIGS. 1 and 2) or inwardly (FIG. 9) of the support leg 26.

Figure 11:
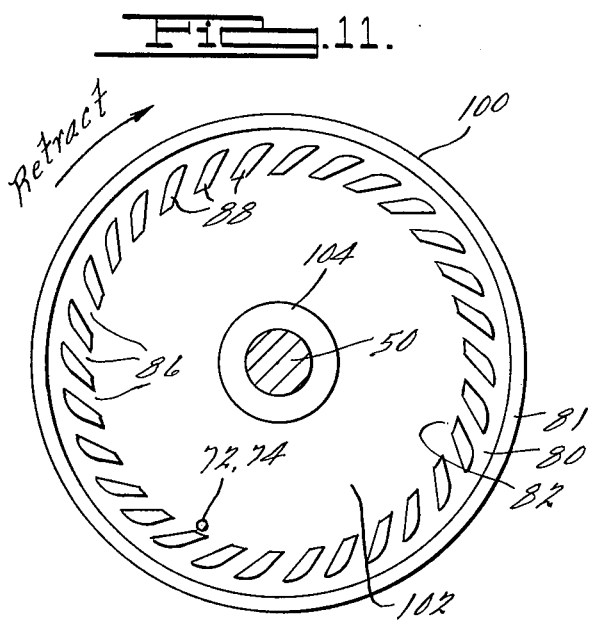
FIGS. 11–14 illustrate a further embodiment of the invention and the manner in which it operates.

As to the operation of the assembly 10 utilizing the grooved plate 100, the location of the finger 72 during the fully retracted position is shown in FIG. 11. This is the same as the corresponding position of the finger 72 in the grooved plate 76, as shown in FIG. 4. During the initial protraction of the seat belt 12, the finger 72 is directed through one of the grooves 86 into the outer groove 80, as shown in FIG. 12. It is to be noted that at this time the pawl 58 is biased to the disengaged condition with respect to the ratchet teeth 54 by the cam 112 thereby exerting a bias on the finger 72 radially outwardly on the plate 100.

Figure 13:
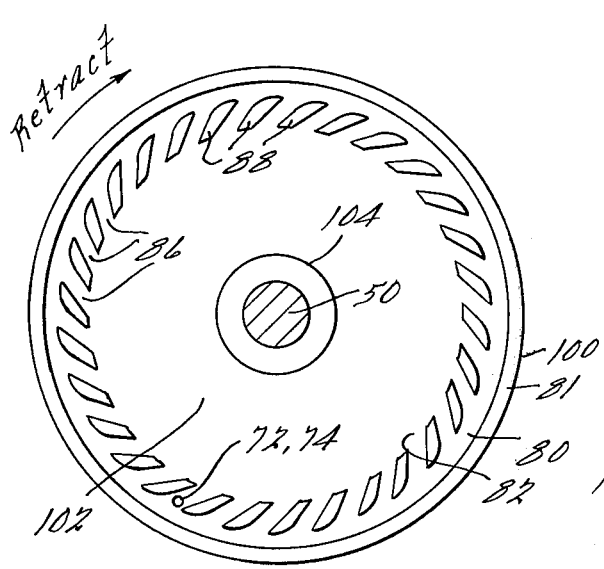
Figure 14:
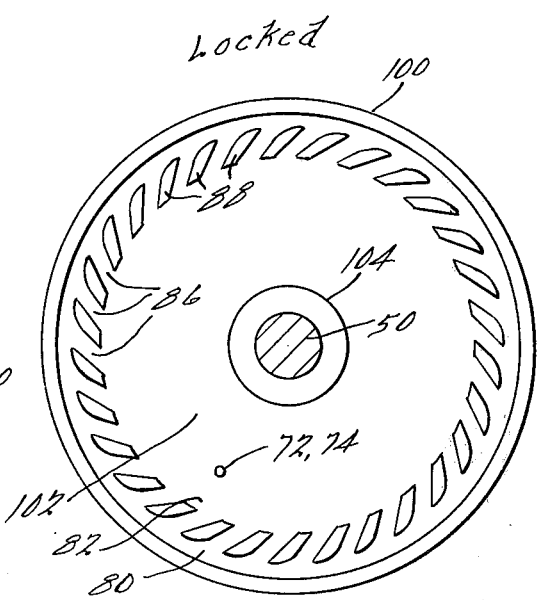

After the belt 12 is protracted a predetermined amount, the cam 112 disengages from the pawl 58, conditioning the pawl 58 for movement to the latched condition under the bias of the spring 70. Such movement of the pawl 58 is precluded during continued protraction of the belt 12 by engagement of the finger 72 with the outer faces of the lands 88. The first increment of retraction following the extension results in the finger 72 being directed back into the radially inner groove 82; this is shown in FIG. 13.

At this point, the force of the spring 70 acting on the pawl 58 causes the pawl 58 to be pivoted to a position where the raised areas 64 and 66 thereon will come into engagement with the ratchet teeth 54 on the spool flanges 44 and 46. This movement of the pawl 58 also causes the finger 72 to be displaced radially inwardly to the approximate position shown in FIG. 14. The tip 74 of the finger 72 is now positioned in the recessed area 102 and the seat belt 12 is locked from any further extension.

To unlock the seat belt assembly, the wearer merely has to unbuckle or release the seat belt 12. The rotation of the spool in a clockwise manner (as shown in FIG. 11) due to the force of the coil spring 20, will disengage the teeth 54 from the pawl 58 and the spool will freely rotate until the seat belt 12 is rewound thereon. At such time as the cam 112 reengages the pawl 58, the finger 72 is again biased radially outwardly to the position shown in FIG. 11, conditioning the finger 72 for movement of the outer groove 80 on the first increment of protraction as described above.

While specific embodiments of the present invention have been illustrated and described in the foregoing specification and accompanying drawings, it is understood that the invention is not limited to the exact construction shown, but that various alterations in the construction and arrangement of parts is possible without departing from the spirit and scope of the invention as more particularly defined in the following claims.

I claim:

1. In a locking seat belt retractor comprising a frame, a spool mounted for rotation on said frame and adapted to have a belt wound thereon, a flexible belt wound on said spool, a spring constantly urging said spool in one direction of rotation to retract the belt thereon, a ratchet and pawl mechanism operable when the ratchet and pawl are engaged to prevent belt extension by preventing rotation of said spool in the unwinding direction of rotation, said ratchet being rotatable with and connected to said spool, and said pawl being pivotedly mounted on said frame, the improvement comprising the combination of the foregoing elements with a locator plate rotatable with said spool and an indexing finger in operable engagement with said pawl, said locator plate having a first circular groove, a second circular groove concentric with said first groove, and a plurality of third grooves connecting said first and second grooves, said indexing finger having a portion in operative engagement with the grooves in said plate, said indexing finger portion being positioned in said first groove upon protraction of said belt thereby to position said pawl towards the disengaged position with respect to said ratchet, said finger moving through one of said third grooves to said second groove upon retraction of said belt thereby to condition said pawl for movement to the locked condition with respect to said ratchet.

2. The invention of claim 1 further comprising resilient means for biasing said pawl in a direction to cause it to engage the ratchet and stop rotation of said spool in said unwinding direction.

3. The invention of claim 1 wherein a fourth groove is provided on said plate in communication with said second groove, said indexing finger being positioned in said fourth groove upon subsequent further protraction of said belt to position said pawl in engagement with said ratchet to prevent belt protraction.

4. The invention of claim 3 wherein said fourth groove is positioned radially inwardly on said plate from said first and second grooves.

5. The invention of claim 1 further comprising means for holding said pawl out of engagement with said ratchet when said belt is substantially fully retracted and which becomes inoperative to prevent engagement of the pawl after a limited protraction of said belt.

6. The invention of claim 5 wherein said pawl holding means comprises a cam and gear mechanism.

7. The invention of claim 5 wherein said pawl holding means includes a follower adapted to come into contact with said belt on said spool and operate in accordance with the amount of windup of said belt.

8. The invention of claim 1 wherein said plate is mounted directly on said spool.

9. The invention of claim 1 wherein said plate is mounted outwardly of said frame.

10. In a locking seat belt retractor comprising a frame, a spool mounted for rotation on said frame and adapted to have a belt wound thereon, a fexible belt wound on said spool, a spring constantly urging said spool in one direction of rotation to retract the belt thereon, a ratchet and pawl mechanism operable when the ratchet and pawl are engaged to prevent belt extension by preventing rotation of said spool in the unwinding direction of rotation means for normally brasing said pawl into engagement with said ratchet, said ratchet being rotatable with and connected to said spool, and said pawl being pivotedly mounted on said frame, a locator plate rotatable with said spool, an indexing finger in operable connection with said pawl, said locator plate having a first circular groove, a second circular groove concentric with said first groove, and a plurality of third grooves connecting said first and second grooves, said indexing finger being in operative engagement with said grooves, said grooves being configured so that when said indexing finger is in said first groove on said plate, said pawl is biased by said indexing finer to the disengaged condition relative to said ratchet, movement of said finger through one of said third grooves into said second groove permitting movement of said pawl by said biasing means towards the locked condition relative to said ratchet, and means separate from said indexing finger for biasing said pawl away from engagement with said ratchet when said belt is substantially retracted.

11. The invention of claim 10 wherein said second groove is positioned radially inwardly of said first groove.

12. The invention of claim 11 wherein said third grooves are positioned at nonradial inclinations on said locator plate and direct said indexing finger between said first and second grooves.

13. The invention of claim 11 wherein said third grooves are spaced closely together in the circumferential direction around said locator plate so that movement of said indexing finger from one circular groove to the other can be effected quickly.

14. The invention of claim 14 wherein said third grooves are inclined at an angle to the radius of said locator plate.

* * * * *